United States Patent Office 3,629,287
Patented Dec. 21, 1971

1

3,629,287
1,3-DIOXOLAN-4-YL-ALKYL AMINES
Waldo R. Hardie, Walnut Creek, and Joseph E. Aaron, Berkeley, Calif., assignors to Cutter Laboratories, Inc., Berkeley, Calif.
No Drawing. Continuation-in-part of abandoned application Ser. No. 547,194, May 3, 1966. This application Oct. 1, 1968, Ser. No. 764,316
Int. Cl. C07d 13/04
U.S. Cl. 260—340.9
12 Claims

ABSTRACT OF THE DISCLOSURE 2-substituted-1,3-dioxolan-4-yl-alkyl amines having tranquilizing activity and useful as intermediates for the production of the corresponding 1,3-dioxolan-4-yl-alkyl-guanidines having anti-hypertensive activity, prepared by the reaction of the corresponding 1,3-dioxolan-4-yl-lower-alkyl halide with a metallo salt of phthalimide followed by hydrolysis.

This application is a continuation-in-part of copending application Ser. No. 547,194, filed May 3, 1966, now abandoned.

SUMMARY OF THE INVENTION

This invention relates to novel dioxolanyl-substituted primary amines. More particularly, it relates to 1,3-dioxolan-4-yl-alkyl amines having tranquilizing activity and which are useful in the production of 1,3-dioxolan-4-yl-alkyl guanidines having anti-hypertensive activity.

The invention sought to be patented resides in the concept of 1,3-dioxolan-4-yl-lower-alkyl amines having pharmacological activity and which are useful as intermediates in the production of the 1,3-dioxolan-4-yl-lower-alkyl-guanidines. These alkyl amines are prepared by the reaction of a 1,3-dioxolan-4-yl-lower-alkyl halide with a metallo salt of phthalimide followed by hydrolysis to an amino group.

The tangible primary amine embodiments of this invention, in their free base and acid addition forms, are novel chemical compounds whose utility includes the inherent applied use characteristic of exhibiting pharmacological activity, particularly on the cardiovascular and central nervous system, including tranquilizing activity, as evidenced by pharmacological evaluation according to standard test procedures and evaluations. These compounds are also useful as intermediates for the production of guanidines having anti-hypertensive activity as disclosed in the copending application Ser. No. 547,194, e.g., by reaction with thiopseudourea.

PRIOR ART 2-substituted-1,3-dioxolan-4-yl-alkyl amines as a class are known in the art (British 784,225). 2,2-dimethyl-1,3-dioxolan-4-yl-methyl amine has been used as an intermediate for the production of acrylamides (British 784,225) and of textile assistants, etc. (British 624,101). 2,2-dimethyl-1,3-dioxolan-4-yl-ethylamine has also been used as an intermediate (British 576,758). 1,3-dioxolan-4-yl-tertiary amines are known. They possess acetylcholine activity (British 601,612).

DETAILED DESCRIPTION

The following is a description of methods for making the compounds of this invention and their use as intermediates to produce the above-described guanidines, shown schematically as follows:

STEP I (A)
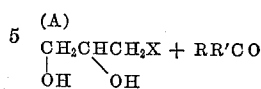

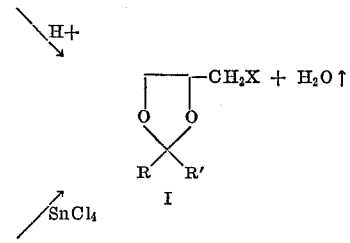

(B)
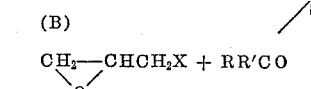

STEP II

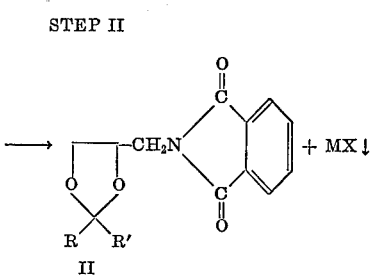

STEP III

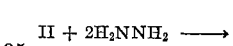

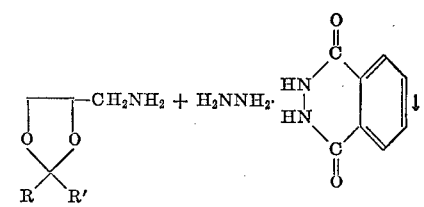

STEP IV

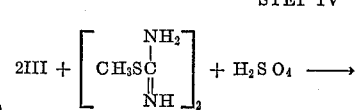

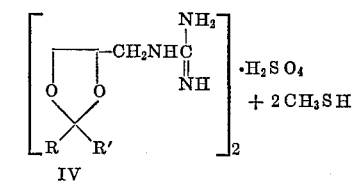

wherein X is a halogen other than fluorine, preferably chlorine; M is an alkali metal, preferably sodium; and R and R' are each hydrogen or a substituent as defined hereinbelow:

In Step I, virtually any non-reactive acidic substance can be used as catalyst. See F. F. Blicke and E. L. Schumann, J. Am. Chem. Soc., 76, 1226 [1954]. Toluenesulfonic acid is preferred. Any inert solvent, e.g., benzene, pentane, or preferably toluene, which provides an azeotropic distillation mixture with water and which phase separates in the Dean-Stark trap can be used. Step I–A is preferred over Step I–B. In Step I–B, neutral inert solvents are used, e.g., CCl₄ or other chlorinated hydrocarbon.

In Step II, dry solvents should be used. N,N-dialkyl acid amides, e.g., dimethyl formamide and dimethyl acetamide, appear to catalyze the reaction. Alkanols, e.g., ethanol, are also useful solvents. Sodium is the preferred metallo salt of the phthalimide, although other salts such as the more readily available potassium phthalimide may also be used.

In Step III, aqueous, hydrated or anhydrous hydrazine can be used. Ninety-five percent ethanol is a useful solvent, although any inert solvent for Intermediate II can be used. At least one mole, and preferably two moles, of hydrazine per mole of the substituted phthalimide is preferably employed. Hydrolysis in alcoholic alkali-metal hydroxide is effective, but gives lower yields than hydrazine. If desired, product III can readily be converted to a secondary lower alkyl substituted amine by methods commonly employed in the art prior to proceeding with Step IV.

Step IV shows the use of the compounds of this invention for the production of pharmacologically active guanidines. Possible variations are the use of other thiopseudoureas (U.S. 3,027,370); ammonia to promote the reaction [Fielding et al., Brit. J. Pharmacol., 24, 395 (1965)]; an acid addition salt of the amine [III] and a thiopseudourea base; use of mono- or disubstituted, e.g., with lower-alkyl, thiopseudoureas of the type described in McKay et al., J. Med. Chem., 6, 592 (1963); 2-methyl thioimidazoline [Short et al., J. Med. Chem. 6, 283 (1963)]; and the use of 3,5-dimethyl-1-guanylpyrazole [Canad. J. Biochem. Physiol. 38, 493 (1960); Scott et al., J. Am. Chem. Soc., 75, 4053 (1963)]; cyanamide [Braun, J. Am. Chem. Soc., 55, 1291 (1933)] or guanidine base and tosylate esters [Monroe, Chem. & Ind., 43, 1806 (1964)].

The following is a description of the compounds of this invention, which are defined by the following formula:

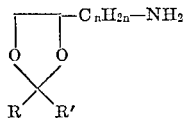

both in free base form and the corresponding acid addition salts thereof, wherein (a) $n$ is an integer from 1 to 2 and R and R' are alike or different and each are alkyl of from 3 to 8 carbon atoms, inclusive, preferably 3 to 6 carbon atoms, e.g., propyl, butyl or amyl, most preferably isopropyl; (b) $n$ is an integer from 1–8, preferably 1–4, most preferably 1 or 2, and R and R', which can be alike or different are substituents containing a total of 7 to 20 carbon atoms and having a collective molecular weight less than 300, preferably less than 200, R being of the group consisting of lower-alkyl of 1–8 carbon atoms, preferably ethyl, propyl, isopropyl, butyl, isobutyl, tert.-butyl, amyl or hexyl, and a carbocyclic ring substituent and R' being a carbocyclic ring substituent, preferably aryl, (c) $n$ is 1 or 2, preferably 2, R is hydrogen and R' is a carbocyclic ring substituent, or (d) $n$ is 1 or 2 and R and R' are collectively part of the same carbocyclic ring substituent containing from 5 to 13 ring carbon atoms and up to 3 rings in which the 2-position carbon atom of the dioxolane ring is a ring carbon atom thereof, as well as being part of the dioxolane ring, i.e., a spirocyclic ring system.

The term "carbocyclic ring substituent" means cyclic substituents containing one or more rings all of whose ring members are carbon atoms. Such ring systems can be monocyclic or polycyclic, i.e., containing two or more separate or fused rings but preferably comprise no more than a total of 3 rings and from 6 to 13 carbon atoms, including aryl ring systems, e.g., of the phenyl, diphenyl, tolyl, xylyl, naphthyl, indanyl and fluorenyl series, cycloalkyl ring systems, e.g., of the cyclopentane, cyclohexane and cycloheptane series, and unsaturated cycloalkyl ring systems, e.g., of the cyclohexene and cycloheptadiene series, e.g., 10,11-dihydro-5H-dibenzo(a,d) cycloheptene and cycloheptatriene series, e.g., 5H-dibenzo(a,d) cycloheptene. The carbocyclic ring substituent can be attached directly to the 2-position carbon atom or via a lower-alkylene bridge to form a carbocyclic ring system of the aralkyl or cycloalkylalkyl series, e.g., benzyl, o-chlorobenzyl, phenethyl, diphenylmethyl, p-tolylbutyl, phenylcyclohexyl-methyl and cyclopentylpropyl. Preferred are the monocyclic aryl, i.e., those having a single benzene ring, e.g., phenyl and substituted phenyl, benzyl and substituted benzyl, phenethyl and substituted phenethyl.

Embraced within the scope of the compounds of this invention are those having one or more, usually not more than four and preferably not more than three, simple substituents on the R and R' substituents, e.g., chloro and fluoro, lower-alkyl, including methyl, ethyl, propyl and octyl, trifluoromethyl, trichloromethyl, lower-alkoxy, including methoxy and ethoxy, aryloxy, and aralkoxy, including benzyloxy and phenoxy, hydroxy, carboxy, nitro, sulfato, acetamido, aryl, including phenyl and aralkyl, including benzyl.

Preferably, so that the activity and characteristic structure is predominantly that of a 1,3-dioxolan-4-yl-alkyl amine, the sum of the molecular weight of these substituents is less than the sum of the molecular weights of the dioxolane and its 2-position substituents, e.g., less than 200 and more preferably less than 150, so that the resulting compound has a total molecular weight of less than 500, preferably less than 400.

Preferred classes of compounds within this invention are the 1,3-dioxolan-4-yl-lower-alkyl amines, meeting one or more of the following requirements: (a) Other than the 2-position of the dioxolane ring, the compound is unsubstituted; (b) other than the primary amino nitrogen atom and the dioxolane ring oxygen atoms, the compounds are hydrocarbon; (c) the lower-alkylene bridging group is methylene or ethylene; (d) one of the valences of the 2-position dioxolane carbon atom is satisfied by an aliphatic hydrocarbon substituent, e.g., lower-alkyl; (e) one of the valences of the 2-position dioxolane carbon atom is satisfied by an aryl hydrocarbon substituent, e.g., phenyl; and (f) the compounds are in their acid addition salt form, preferably a pharmaceutically acceptable acid addition salt, e.g., hydrochloride or sulfate.

As stated above, all the compounds of this invention have utility as intermediates for the production of the corresponding 1,3-dioxolan-4-yl-alkyl guanidines. Additionally, they are useful per se as pharmacologics although each of the four classes of compounds defined by the above formula do not possess the same spectrum of activity. Also, activity varies in degree and character from member to member in any one of these classes in the usual manner expected of any series of the compounds having pharmacological activity. For example, those defined by (d) have a substantially different effect upon the cardiovascular system which usually manifests itself by a substantial rise in arterial pressure. Those defined by (a), (b) and (c) tend to lower mean arterial pressure (MAP) and act as tranquilizers. However, all compounds of this invention are useful as pharmacologics.

Examples of compounds within the above definitions, in addition to those described in the examples hereinafter, are 2,2-diphenyl-1,3-dioxolan-4-yl-ethylamine,
2-benzyl-2-isopropyl-1,3-dioxolan-4-yl-ethylamine,
2-phenyl-2-ethyl-1,3-dioxolan-4-yl-n-propylamine,
2-α-naphthyl-2-methyl-1,3-dioxolan-4-yl-isobutylamine,
2-(2'-indanyl)-1,3-dioxolan-4-yl-ethylamine,
2-(9'-fluorenyl)-1,3-dioxolan-4-yl-ethylamine, 2-phenyl-2-cyclopentyl-1,3-dioxolan-4-yl-methylamine,
2,2-di-cyclohexyl-1,3-dioxolan-4-yl-methamine,
2,2-di-isopropyl-1,3-dioxolan-4-yl-ethylamine, the sulfate acid addition salt of each of the above and the tartrate acid addition salt of each of the above.

The compounds of this invention possess asymmetric carbon atoms. They can thus exist as a mixture of its optical isomers or by conventional separation techniques, in the form of an optical isomer substantially free from the other isomers.

The following is a description of the method of using the compounds of this invention:

The 1,3-dioxolan-4-yl-lower-alkyl amines of this invention and the guanidines into which they can be converted are useful in scientific research, particularly in the field of pharmacology. Their pharmacological activity renders them useful in modifying body functions in laboratory test animals and other mammals by a modification of nerve impulses, e.g., the sympathetic nervous system. This activity manifests itself in laboratory tests utilized to detect tranquilizing and sympathetic nervous system regulating activity; e.g., Septal rat—Brady and Danta, J. Comp. Physiol. Psychol. 46:339 (1953); reserpinized dog; carotid occlusion, nictitating membrane and norepinephrine depletion tests.

In the Carotid Occlusion Test, a dog is anesthetized with 20 mg./kg. of thiopental and maintained with 60 mg./kg. of chloralose by IV injection. The femoral artery and vein are catheterized and the common carotid arteries are isolated for bilateral clamping. After determining the control arterial pressor response to 30 seconds of carotid occlusion, the test compound is administered and the response is again measured. The dose which produces approximately a 40 percent inhibition of the pressor response is used for potency comparison with other drugs.

In the Nictitating Membrane Test, a cat is anesthetized with Dialurethane (0.9 cc./kg.I.P.), with the femoral artery and vein catheterized. The nicitating membrane is drawn out and attached to a thread fastened to a force-displacement transducer. The preganglionic nerve to the superior cervical ganglion is isolated for stimulation by supra maximal electrical shock. After determining the control response to pre-ganglionic stimulation, the drug is administered by intravenous injection and the dose which produces at least a 10 percent reduction in response is used for potency comparison with other test drugs.

In the Norepinephrine Depletion Test, albino guinea pigs weighing 200 to 300 g. are treated with the drug in three test groups, i.e., control, 5 mg./kg.I.P., and 10 mg./kg.I.P., and then sacrificed after 15 to 18 hours. Quickly the hearts were removed, flushed with saline, placed in a vial and frozen in a Dry Ice-acetone bath. The hearts are individually analyzed for norepinephrine by the method of J. R. Crout, J. Pharmacol. 132, 269 (1961) and the level of depletion below control levels compared with other test drugs.

When the compositions of this invention are used as pharmaceuticals, they can be administered orally in the form of pills, tablets, capsules, e.g., in admixture with talc, starch, sugar, milk sugar, or other inert, i.e., nontoxic or pharmacologically acceptable pharmaceutical carrier, or in the form of aqueous solutions, suspension, encapsulated suspensions, gels, elixers, aqueous alcoholic solutions, e.g., in admixture with sugar or other sweetening agents, flavorings, colorants, thickeners, and other conventional pharmaceutical excipients. When injected subcutaneously, intravenously or intramuscularly, usually the latter, they can be administered, e.g., as an aqueous or peanut oil solution or suspension using excipients and carriers conventional for this mode of administration. The best route of administration and the best dosage will be apparent from the laboratory tests for activity and toxicity of the selected compound conventionally undertaken as part of the development phase of a pharmaceutical.

In the following preparations and examples, which are illustrative of the process and products of this invention, temperatures are in degrees centigrade.

Example I.—1,4 - dioxaspiro-[4,5]-decane-2-methylamine sulfate

Step I.—2-chloromethyl-1,4-dioxaspiro[4,5]-decane

The preparations of this intermediate compound are illustrative of the methods used to make each of the corresponding first step intermediates leading to the amines of this invention. The first procedure is preferred.

Procedure A

In a reflux distillation apparatus (see F. F. Blicke and E. L. Schumann, J. Am. Chem. Soc., 76, 1226 (1954)) equipped with a Dean-Stark trap was placed 442 g. of 3-chloro-1,2-propanediol and 4 g. of p-toluene sulfonic acid and 1300 ml. of toluene. After reflux had been established, 392 g. of cyclohexanone was added dropwise during a period of 30 minutes. The mixture was then refluxed for 6 hours until water ceased to accumulate in the trap. A total of 68 ml. of water was collected. The solution was cooled and the pH adjusted to neutrality with sodium methylate and filtered. The filtrate was distilled, removing the toluene first and then 2-chloromethyl-1,4-dioxaspiro[4,5]decane. $N_D^{25}$ 1.4754, at 112–116°/14.5 mm.

Procedure B

Using the method of F. F. Blicke and F. E. Anderson, J. Am. Chem. Soc., 74, 1735 (1952), this reaction is generally applicable to this group of intermediates. In a reaction flask equipped with a large stirrer, ice bath, dropping funnel, and protected from moisture by drying tubes, was placed 200 g. of cyclohexanone, 200 g. of epichlorohydrin, and 500 ml. of anhydrous carbon tetrachloride. When the solution had cooled to 10°, 67 g. of stannic chloride was added dropwise over a period of 2.5 hours with stirring. After another hour of stirring at room temperature, 69.8 g. of potassium hydroxide in 300 ml. of water was added at a temperature of 5 to 10°. After standing some hours, the aqueous phase was decanted and extracted with ether. The combined carbon tetrachloride and ether solutions were dried over anhydrous potassium carbonate and distilled. The portion boiling at 118 to 124°/15 mm., $N_D^{25}$ 1.4750, was used.

Analysis.—Calculated for $C_9H_{15}ClO_2$ (percent): Cl, 18.6. Found (percent): Cl, 18.06.

Step II.—2-(Phthalimidomethyl) - 1,4 - dioxaspiro[4,5] decane

The preparation of this phthalimido derivative is illustrative of the general procedure which was satisfactory for all such intermediates. See J. H. Billman and R. Vincent Cash, J. Am. Chem. Soc. 75,2500 (1953).

A 9.1 g. portion of sodium hydride (52.3 percent in mineral oil suspension) was slurried with about 80 ml. of anhydrous dimethyl formamide, and then 29.4 g. of phthalimide was transferred gradually to the reaction mixture from an attached flask connected by tubing to form a closed system. After an additional period of about one hour at temperatures varying up to 70°, 38.1 g. of 2-chloromethyl-1,4-dioxaspiro[4,5]decane was added together with 0.5 g. of sodium iodide (optional) in 20 ml. of dry dimethylformamide, and the mixture was heated at reflux for 5 hours and then filtered hot leaving 10.8 g. of sodium chloride on the filter. Reaction is practically complete after 2 hours at reflux. Reaction at 125° appears to require at least 24 hours for a similar yield. The filtrate was evaporated at reduced pressure on the steam bath to an oily residue which was diluted with 200 ml. of benzene and filtered. The filtrate was washed once with 100 ml.

of 1 percent aqueous sodium hydroxide and 3 times with 300 ml. of water. The benzene was removed at reduced pressure on the steam bath and the residue triturated with petroleum ether, whereupon it crystallized to give 2-(phthalimido-methyl)1,4-dioxaspiro[4,5]decane, melting at 87–90°. Crystallization may also be induced with isopropanol.

This compound was also made by a similar procedure but using commercial potassium phthalimide reagent in place of the sodium phthalimide used in the procedure described above. 102 grams of 2-chloromethyl-1,4-dioxaspiro[4,5]decane, 121 g. of potassium phthalimide, 6 g. of potassium iodide, and 500 ml. of anhydrous dimethyl formamide were mixed and refluxed gently for approximately 16 hours with the reflux condenser closed by a calcium chloride drying tube. The solution was filtered hot, and 48.1 g. of potassium chloride was recovered. The filtrate was diluted with 500 ml. of water which precipitated an oil. The aqueous portion was extracted twice with 250 ml. portions of chloroform which were combined and mixed with the oily precipitate. This chloroform was then washed with water, dried with magnesium sulfate, and evaporated to an oil which crystallized when triturated with isopropanol. The crude product was recrystallized from ethanol and the crystals washed with 50 ml. of 8 percent aqueous sodium hydroxide, followed by a wash with 50 ml. of water, and then dried to give 2-(phthalimido-methyl) - 1,4 - dioxaspiro[4,5]decane, melting at 91–92°.

*Analysis.*—Calculated for $C_{17}H_{19}NO_4$ (percent): C, 68.03; H, 6.38. Found (percent): C, 68.20; H, 6.52.

Step III.—1,4-dioxaspiro[4,5]decane-2-methylamine sulfate 20.3 grams of 2-phthalimidomethyl-1,4-dioxaspiro[4,5]decane and 4.5 ml. of hydrazine (95 percent anhydrous) were heated at reflux in 300 ml. of ethanol with vigorous stirring for one hour. The cooled slurry was diluted with 200 ml. of dry ether, filtered, and the precipitate was washed twice with 100 ml. portions of ether. The combined filtrates and washes was evaporated to 100 ml. of residue and diluted with 100 ml. of fresh ether and refiltered. The filtrate was evaporated to an oily residue which was dissolved in 10 ml. water and adjusted to pH 6.0 with 50 percent sulfuric acid. A precipitate formed and was filtered, washed with ether, and dried to give 1,4-dioxaspiro[4,5]decane-2-methylamine sulfate, melting at 237.5–239.5°.

*Analysis.*—Calculated for $(C_9H_{17}NO_2)_2H_2SO_4$ (percent): C, 49.07; H, 8.24; N, 6.36; S, 7.28. Found (percent): C, 48.75; H, 8.37; N, 6.32; S, 6.98.

The oily residue is usually of suitable purity and is in the desired free base form for use in the Step IV reaction, and therefore can be used as such. For further purification when necessary the amines can be distilled or converted to sulfate salts or both.

Example II

The following table gives the melting point and/or boiling point of primary amines of this invention and intermediates thereto prepared by the above procedures and used to prepare the guanidine compounds following the examples.

TABLE I

| | | | Step I | Step II | Step III |
|---|---|---|---|---|---|
| | | | —Cl | —N(CO)₂C₆H₄ | —NH₂ |
| Compound | R₁ | R₂ | B.P. (mm) | M.P. (b.p. (mm)) | M.P., salt (b.p. (mm) base) |
| 1 | | —(CH₂)₅— | 114°/14.5 | 90–93° | 234–236° (H₂SO₄) |
| 2 | | —CHCl—(CH₂)₄— | 143–4°/12 | 112–115° | 225–227° (H₂SO₄) |
| 3 | | —(CH₂)₂—CHCH₃—(CH₂)₂— | 122–130°/12 | | 246–247° (H₂SO₄) (91–110°/0.6) |
| 4 | | —CH₂—C(CH₃)₂—CH₂—C(CH₃)₂— | 137–140°/12 | 90–92° | |
| 5 | | —(CH₂)₂—CHOCH₃—(CH₂)₂— | | | ¹ 248–249° (H₂SO₄) |
| 6 | | —CH(C₆H₅)—(CH₂)₄— | 109–120°/0.1 | 80–90° | ¹ 203–205° (H₂SO₄) |
| 7 | | —(CH₂)₆— | 120–125°/12 | 93–95° | 232° (H₂SO₄) |
| 8 | | —(CH₂)₇— | 145°/13 | | 230–231° (H₂SO₄) (80–84°/0.1) |
| 9 | | —CH₂—(o-C₆H₄)—CH₂— | 49–51° (114°/0.9) | | |
| 10 | | —(CH₂)₄— | (99–100°/11) | 96–99° | ¹ 234–235° (H₂SO₄) (65–70°/.15) |

TABLE I—Continued

|  |  |  | Step I | Step II | Step III |
|---|---|---|---|---|---|
|  |  |  | —Cl | —N(CO)$_2$C$_6$H$_2$ | —NH$_2$ |
| Compound | R$_1$ | R$_2$ | B.P. (mm) | M.P. (b.p. (mm)) | M.P., salt (b.p. (mm) base) |
| 11 | H | H | | 73–75° | 171.5° (HCl) (70–75°/17) |
| 12 | CH$_3$ | CH$_3$ | (45–50°/12) | | (60–65°/12) |
| 13 | C$_2$H$_5$ | C$_2$H$_5$ | (75–80°/12) | 44–46° | 221–223° (H$_2$SO$_4$) (89–90°/12) |
| 14 | i-C$_3$H$_7$ | i-C$_3$H$_7$ | (107–112°/19) | | ¹ 188–190° (HCl) |
| 15 | n-C$_3$H$_7$ | n-C$_3$H$_7$ | (105°/12) | | (105–123°/12) |
| 16 | C$_6$H$_5$ | C$_6$H$_5$ | 52–54° | 129–130° | 230° (HCl) |
| 17 | C$_6$H$_{11}$ | C$_6$H$_{11}$ | (119–122°/0.5) | | |
| 18 | C$_6$H$_5$ | C$_2$H$_5$ | (100–108°/1.5) | 86–90° | 164–166.5° (succinate) |
| 19 | C$_6$H$_5$ | CH$_3$ | (99–100°/1.5) | 94–112° | 201–204° (H$_2$SO$_4$) |
| 20 | C$_6$H$_5$ | n-C$_3$H$_7$ | (132–134°/4) | | 136.5–155° (plus tartrate) |
| 21 | o-CH$_3$OC$_6$H$_4$ | H | 162–171°/4.3 | 93–105° | 126–129° (p-TSA) |
| 22 | p-CH$_3$OC$_6$H$_4$ | H | 147–151°/1 | 99–110° | 142–144° (H$_2$SO$_4$) |
| 23 | p-F—C$_6$H$_4$ | C$_2$H$_5$ | (105–109°/1.3) | 80–100° | 165.3–167.3° (H$_2$SO$_4$) |
| 24 | p-CH$_3$OC$_6$H$_4$ | C$_2$H$_5$ | (130–134°/0.9) | 70–93° | 156–160° (H$_2$SO$_4$) |

¹ Dec.

Another means of preparing the amines of this invention is by reduction of the corresponding nitrile compound. This reduction can be accomplished by catalytic reduction or by chemical means, as shown by the following examples:

Example III.—2-ethyl-2-phenyl-1,3-dioxlane-4-ethylamine

A solution of 18 g. of 2-ethyl-2-phenyl-1,3-dioxolane-4-acetonitrile was prepared in 180 ml. of anhydrous ethanol containing 15 g. of ammonia. To this reaction mixture was added 3 g. of 5 percent rhodium on alumina and the mixture was subjected to 50 p.s.i. of hydrogen and shaken for a period of approximately three hours in a Paar apparatus. The reaction solution was filtered, evaporated at 15 mm. pressure and the oily residue was distilled to give 2-ethyl-2-phenyl-1,3-dioxolane-4-ethylamine, B.P. 94–97°/1 mm.

Analysis.—Calculated for C$_{13}$H$_{19}$NO$_2$ (percent): C, 70.56; H, 8.65; N, 6.33. Found (percent): C, 70.46; H, 8.71; N, 6.19.

A solution of the 0.01 moles of the amine in 25 ml. of anhydrous ether was treated with 0.01 moles of p-toluenesulfonic acid dissolved in 50 ml. of anhydrous ether. The precipitate was filtered, washed with ether and recrystallized from 175 ml. of absolute alcohol to give the corresponding p-toluene-sulfonic salt, M.P. 122–124° C.

Analysis.—Calculated for C$_{13}$H$_{19}$NO$_2$·C$_7$H$_8$O$_3$S (percent): C, 61.05; H, 6.92; N, 3.56. Found (percent): C, 60.95; H, 6.79; N, 3.48.

2-ethyl-2-phenyl-1,3-dioxolane-4-acetonitrile was prepared by stirring a mixture of 10 g. of 3,4-dihydroxybutyronitrile with 20 g. of 1-phenyl-1,1-dipropoxypropane at room temperature in the presence of 0.05 g. of p-toluenesulfonic acid for a period of approximately three hours. A precipitate was separated by filtration, washed with pentane and recrystallized from pentane to give the nitrile, M.P. 59–60.5° C.

Analysis.—Calculated for C$_{13}$H$_{15}$NO$_2$ (percent): C, 71.87; H, 6.96; N, 6.45. Found (percent): C, 71.86; H, 6.67; N, 6.61.

3,4-dihydroxybutyronitrile may be prepared by the method of J. Boileau and co-workers, Bull. Soc. Chim., France, 3, 338 (1957). 1-Phenyl-1, 1-dipropoxypropane was prepared by the method of W. R. Hardie and co-workers, J. Med. Chem., 9, 132 (1966).

Example IV.—1,4-dioxaspiro[4,5]decane-2-ethylamine

To a 500 ml. flask containing dry nitrogen and fitted with stirrer, dropping funnel and condenser was added 8 g. of lithium aluminum hydride and 200 ml. of anhydrous ether. The suspension was stirred and treated dropwise with 36 g. of 1,4-dioxaspiro[4,5]decane-2-acetonitrile at reflux during a period of 30 minutes. After stirring a few hours, 8 ml. of water, 6 ml. of 20 percent aqueous sodium hydroxide and 28 ml. of water were successively added followed by filtration of the resulting precipitate. The filtrate was evaporated to give 1,4-dioxaspiro[4,5]decane-2-ethylamine as an oil, B.P. 98–103°/2 mm.

Analysis.—Calculated for C$_{10}$H$_{19}$NO$_2$ (percent): C, 64.82; H, 10.34; N, 7.56. Found (percent): C, 65.09; H, 10.49; N, 7.65.

A solution of 13 g. of the amine in 50 ml. of anhydrous ether was treated with 3.45 g. of concentrated sulfuric acid dissolved in 50 ml. of anhydrous ether. The precipitate was filtered, washed with ether and recrystallized from 300 ml. of absolute ethanol to give its sulfate salt, M.P. 250° decomposition.

Analysis.—Calculated for (C($_{10}$H$_{19}$NO$_2$)$_2$H$_2$SO$_4$ (percent): C, 51.26; H, 8.60; N, 5.98. Found (percent): C, 51.13; H, 8.48; N, 5.72.

The 1,4-dioxaspiro[4,5]decane-2-acetonitrile was made by the method described in Step I, procedure A, using 3,4-dihydroxybutyronitrile in place of 3-chloro-1,2-propanediol, B.P. 98–103°/2 mm.

Analysis.—Calculated for C$_{10}$H$_{15}$NO$_2$ (percent): C, 66.27; H, 8.34; N, 7.73. Found (percent): C, 66.01; H, 8.44; N, 7.98.

The following examples show the use of the compounds of this invention as intermediates for the preparation of the pharmacologically active guanidines:

A mixture of 10.5 g. of 1,4-dioxaspiro[4,5]decane-2-methylamine and 8.6 g. of 2-methyl-2-thiopseudourea sulfate in 40 ml. of water was heated on the steam bath for 4 hours during which 2.0 g. of methylmercaptan was collected in a Dry Ice bath connected to the reaction flask through a water cooled reflux condenser. The reaction mixture was then evaporated at 15 mm. pressure to a solid residue which was then dissolved in 80 ml. of 50/50 methanol-ethanol. The solution was filtered and evaporated to approximately 50 ml. volume and allowed to cool and crystallize giving a crop melting at 213.5 to 215° of (1,4-dioxaspiro[4,5]decan-2-ylmethyl)guanidine sulfate.

Another preparation which incorporated ammonia in the final crystallization step gave a product which, when crystallized from water, apparently resulted in the formation of another crystal form, melting at 243–245° dec. This appears to be the stable form since recrystallization from methanol-ethanol did not alter the melting point.

This compound, in addition to pronounced anti-hypertensive activity, stimulates growth of the male accessory reproductive organs.

Following the above procedure, 31 g. of 6-chloro-1,4-dioxaspiro[4,5]decane-2-methylamine, 23 g. of 2-methyl-2-thiopseudourea sulfate, and 75 ml. of water were heated for 2 hours and then evaporated at reduced pressure and the residue was recrystallized from methanol twice to give (6-chloro-1,4-dioxaspiro[4,5]decan-2-ylmethyl) guanidine sulfate, melting at 232–234°. This compound possesses uterotrophic activity in addition to marked anti-hypertensive activity.

In 30 ml. of water were dissolved 11.5 g. of 8-methyl-1,4-dioxaspiro[4,5]decane-2-methylamine sulfate, 6.8 g. of 2-methyl-2-thiopseudourea sulfate, and 2.0 g. of sodium hydroxide. The solution was heated for 4.5 hours on the steam bath and was then evaporated at reduced pressure to a solid. This was dissolved in 90 ml. of an equal parts mixture of methanol-ethanol-water. The solution was filtered and then evaporated to about ⅔ volume and then allowed to stand. Three successive crops of crystals were obtained at room temperature and at +2°. These were combined and recrystallized from 17 percent water in methanol to give (8-methyl-1,4-dioxaspiro[4,5]decan-2-ylmethyl)guanidine sulfate melting at 259°. This compound possesses anti-hypertensive activity.

Following the above procedure, 34 g. of 7,7,9,9-tetramethyl-1,4-dioxaspiro[4,5]decane-2-methylamine and 23 g. of 2-methyl-2-thiopseudourea sulfate were dissolved in 50 ml. of water and reacted for 2 hours to give (7,7,9,9-tetramethyl-1,4-dioxaspiro[4,5]decan-2-ylmethyl)-guanidine sulfate, melting at 254–256° after one recrystallization from methanol. This compound possesses anti-hypertensive activity.

By the above procedure, 37.6 g. of 8-methoxy-1,4-dioxaspiro[4,5]-decane-2-methylamine was reacted with 23 g. of 2-methyl-2-thiopseudourea sulfate. The recrystallization of the product from isopropanol was very slow. A second and third crop were obtained by dilution of the mother liquor with ether. The crops were combined and recrystallized from isopropanol and then from methanol. The impure product was then dissolved in aqueous caustic at pH 11. The solution was then washed with ether and finally readjusted to pH 7.4. The water was removed at reduced pressure and the residue was recrystallized from ethanol by ether dilution to give (8-methoxy-1,4-dioxaspiro[4,5]decan-2-ylmethyl)guanidine sulfate melting at 216–218°. This compound possesses anti-hypertensive activity.

Following the above procedure, 39 g. of 6-phenyl-1,4-dioxaspiro[4,5]decane-2-methylamine was reacted with 23 g. of 2-methyl-2-thiopseudourea sulfate to give a crystalline residue after removal of the reaction solvent at reduced pressure. The residue was washed with concentrated aqueous potassium bicarbonate and then triturated first with ether and then with ether-ethanol to give (6-phenyl-1,4-dioxaspiro[4,5]decan-2-ylmethyl)guanidine sulfate, melting at 244–245° dec. This compound possesses anti-hypertensive activity.

By the above procedure, 28 g. of 1,4-dioxaspiro[4,6]undecane-2-methylamine was reacted with 20 g. of 2-methyl-2-thiopseudourea sulfate in 50 ml. of water for approximately 2 hours during which a heavy precipitate formed. It was separated and recrystallized from methanol twice to give (1,4-dioxaspiro[4,6]undecan-2-ylmethyl)guanidine sulfate, M.P. 255–256°. This compound in addition to strong anti-hypertensive activity, blocks the cardiac-conditioning response and has anti-inflammatory activity by the limb volume test.

Following the above procedure, 32 g. of 1,4-dioxaspiro[4,7]-dodecane-2-methylamine, 23 g. of 2-methyl-2-thiopseudourea sulfate, and 75 ml. of water were heated for 1.5 hours and then allowed to stand overnight when a heavy precipitate formed and was filtered off. It was recrystallized from methanol to give (1,4-dioxaspiro[4,7]-dodecan-2-ylmethyl)guanidine sulfate, melting at 260–261°. This compound possesses anti-inflammatory activity in addition to anti-hypertensive activity.

According to the above procedure, 20 g. of spiro(1,3-dioxolane-2,2'-indan)-4-methylamine, 14 g. of 2-methyl-2-thiopseudourea sulfate, and 65 ml. of water were heated on the steam bath and upon cooling a heavy precipitate formed which was filtered from the mother liquor and recrystallized from 200 ml. of ethanol to give [spiro(1,3-dioxolane-2,2'-indan)-4-ylmethyl]-guanidine sulfate, melting at 234–235°. This compound possesses anti-hypertensive activity.

Following the above procedure, 35 g. of 1,4-dioxaspiro-[4,4]-nonane-2-methylamine and 21 g. of 2-methyl-2-thiopseudourea sulfate were reacted in 30 ml. of water. Evaporation at reduced pressure and re-evaporation after adding propanol to the residue gave an amorphous product which crystallized when stirred with 50 ml. of ethanol. The mixture was diluted with 200 ml. of dry ether and filtered. The crude product was recrystallized from ethanol and then from methanol to give (1,4-dioxaspiro[4,4]non-2-ylmethyl)-guanidine sulfate, melting at 205° dec. This compound possesses anti-hypertensive activity.

Using the above procedure, 15.3 g. of 1,3-dioxolane-4-methylamine was reacted with 13.9 g. of 2-methyl-2-thiopseudourea sulfate. The reaction mixture was evaporated at reduced pressure on the steam bath to a colorless amorphous semi-solid. It was dissolved in 170 ml. of methanol and re-evaporated to an amorphous solid at high vacuum. This material was triturated with anhydrous ether to give an amorphous solid which was pulverized and triturated with fresh anhydrous ether to give (1,3-dioxolan-4-ylmethyl)guanidine sulfate as a white powder which softened at approximately 60° and melted at 100° with decomposition. This compound, in addition to anti-hypertensive activity, is a lipase inhibitor.

By the above procedure, 29.5 g. of 2,2-dimethyl-1,3-dioxolane-4-methylamine was reacted with 21 g. of 2-methyl-2-thiopseudourea sulfate. The crude product was recrystallized twice from propanol without prior treatment with ether. It was finally recrystallized from 95 percent ethanol to give (2,2-dimethyl-1,3-dioxolan-4-ylmethyl)guanidine sulfate, melting at 181°. This compound possesses anti-hypertensive activity.

Following the above procedure, 20 g. of 2,2-diethyl-1,3-dioxolane-4-methylamine and 14 g. of 2-methyl-2-thiopseudourea sulfate were reacted in 25 ml. of water. The product precipitated as a crystalline solid upon cooling the reaction mixture and was filtered. It was recrystallized from ethanol to give ,2,2-dimethyl-1,3-dioxolan-4-ylmethyl)guanidine sulfate, melting at 229–231°. This compound possesses anti-hypertensive activity.

A mixture of 5.2 g. of 2,2-diisopropyl-1,3-dioxolane-4-methylamine and 4.0 g. of 2-methyl-2-thiopseudourea hydrochloride in 25 ml. of water was heated on the steam bath for one hour. Then the solvent was evaporated at reduced pressure and the residue was dissolved in 25 ml. of hot isopropanol and the solution was re-evaporated to a residue at reduced pressure. The residue was again dissolved in isopropanol and set aside at +2° for 3 days and a precipitate of 0.8 g. was filtered off. The filtrate was concentrated partially and allowed to stand for several days when it became crystalline. The mass was washed with hot ethylacetate, filtered, and dried to give crystals, melting at 143–145°, of (2,2-diisopropyl-1,3-dioxolan-4-ylmethyl)guanidine hydrochloride. This compound possesses anti-hypertensive activity.

By the above procedure, 17.4 g. of 2,2-dipropyl-1,3-dioxolane-4-methylamine and 20.8 g. of 2-methyl-2-thiopseudourea sulfate in 30 ml. of water were reacted for 3 hours and the volatile material was then removed at reduced pressure. The residue was treated with 50 ml. of ethanol and re-evaporated to a heavy syrup which was dissolved in 100 ml. hot isopropanol, filtered, and diluted with about 200 ml. of ethylacetate to give a crystalline precipitate. This crop was recrystallized from 30 ml. of water to give (2,2-dipropyl-1,3-dioxolan-4-ylmethyl)-guanidine sulfate, melting at 175–178°. This compound possesses anti-hypertensive activity.

9.1 grams of 2,2-diphenyl-1,3-dioxolane-4-methylamine hydrochloride was suspended in 20 ml. of 10 percent aqueous sodium hydroxide and extracted with two 40 ml. portions of ether. The combined extracts were dried and evaporated to an oil which was treated with 4.8 g. of 2-methyl-2-thiopseudourea sulfate as described above for a period of 2 hours. The reaction mixture was evaporated at reduced pressure to a white solid which was then recrystallized from approximately 250 ml. of 50/50 ethanol-water 3 times to give (2,2-diphenyl-1,3-dioxolan-4-ylmethyl)guanidine sulfate, melting at 229°. This compound, in addition to mild anti-hypertensive activity, has anti-inflammatory activity, is a lipase inhibitor and decreases postprandial lipemia of rats.

A solution of 27 g. of 2,2-dicyclohexyl-1,3-dioxolane-4-methylamine in 40 ml. of ethanol was mixed with 13 g. of 2-methyl-2-thiopseudourea hydrochloride dissolved in 60 ml. of ethanol in a flask connected by a closed system through a water-cooled reflux condenser to a Dry Ice trap. The flank was then heated on the steam bath to reflux for 3 hours during which time 2.5 g. of methylmercaptan was collected. The reaction mixture was then diluted with 75 ml. of ether. Two liquid phases formed and the aqueous phase, a heavy syrup, was separated. It was diluted with water and washed with fresh ether and then allowed to stand at +2° for 2 days when a precipitate was separated. It was recrystallized from 25 ml. of water and then from methanol-ethyl-acetate to give (2,2 - dicyclohexyl - 1,3-dioxolan-4-ylmethyl)guanidine hydrochloride, melting at 86–90°. This compound possesses lipase inhibiting as well as anti-hypertensive activity.

Following the above procedure, 11.0 g. of 1,4-dioxa-spiro[4,5]-decane-2-ethyl-amine and 8.1 g. of 2-methyl-2-thiopseudourea sulfate in 25 ml. of water was heated on the steam bath for 2 hours. The solution was evaporated to one-half its volume and the precipitate which formed was recrystallized from ethanol-methanol, dried, to give crystals, melting at 261–263°, of [2-(1,4-dioxa-spiro[4.5]decan-2-yl)ethyl]guanidine sulfate. This compound possesses anti-hypertensive activity.

By the above procedure, 37.5 g. of 2-ethyl-2-phenyl-1,3-dioxolane-4-methyl-amine and 20.5 g. of 2-methyl-2-thiopseudourea sulfate in 25 ml. of water was heated on the steam bath for 2 hours; the water was removed and the residue was triturated with benzene, then ether to induce crystallization. The material was recrystallized three times from ethanol, to give (2-ethyl-2-phenyl-1,3-dioxolan-4-yl-methyl)guanidine sulfate, melting at 211–212.5°. This compound is hypotensive.

By the above procedure, 2-ethyl-2-phenyl-1,3-dioxolane-4-ethyl-amine and 2-methyl-2-thiopseudourea sulfate when heated on the steam bath in water, gave (2-ethyl-2-phenyl-1,3-dioxolan-4-yl-ethyl)guanidine sulfate.

Obvious variations of the above-described invention will be apparent to those skilled in the art to which this invention pertains.

What is claimed is:

1. A 1,3-dioxolan-4-yl-alkylamine of the formula:

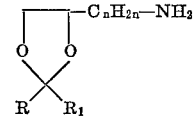

wherein $n$ is an integer from 1 to 8 and R and R' are substituents having a collective molecular weight of less than 300 and a total of 7 to 20 carbon atoms, R being lower-alkyl and R' being a carbocyclic aromatic substituent attached directly to the dioxolane ring or via an alkylene bridge containing 1–4 carbon atoms and selected from the group consisting of phenyl, diphenyl and naphthyl, and pharmaceutically acceptable acid addition salts thereof.

2. A compound of claim 1 wherein $n$ is 1 to 2 and R' is a phenyl group attached directly to the dioxolane ring or via an alkylene bridge containing one to four carbon atoms.

3. A compound of claim 2 wherein the phenyl group is attached directly to the dioxolane ring.

4. A compound of claim 3 wherein $n$ is 1.

5. A compound of claim 4 selected from the group consisting of 2-phenyl-2-ethyl-1,3-dioxolan-4-yl-methyl-amine and pharmaceutically acceptable salts thereof.

6. A compound of claim 3 wherein $n$ is 2.

7. A compound of claim 6 selected from the group consisting of 2 - phenyl-2-ethyl-1,3-dioxolan-4-yl-ethyl amine and pharmaceutically acceptable salts thereof.

8. A 2,2 - dialkyl-1,3-dioxolan-4-yl-alkylamine wherein the alkyl groups at the 2-position each contain from 3 to 8 carbon atoms, inclusive, and the bridging alkyl group contains from 1 to 2 carbon atoms, and pharmaceutically acceptable acid addition salts thereof.

9. A compound of claim 8 selected from the group consisting of 2,2-di-isopropyl-1,3-dioxolan-4-yl-methyl-amine and pharmaceutically acceptable acid addition salts thereof.

10. A 1,3-dioxolan-4-yl-alkylamine of the formula

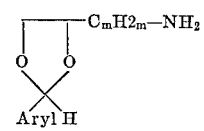

wherein $m$ is 1 or 2 and Aryl is a carbocyclic aromatic substituent attached directly to the dioxolane ring or via an alkylene bridge containing 1–4 carbon atoms and selected from the group consisting of phenyl, diphenyl and naphthyl, and pharmaceutically acceptable acid addition salts thereof.

11. A compound of claim 10 wherein Aryl is monocyclic.

12. A compound of claim 11 selected from the group consisting of 2-phenyl - 1,3 - dioxolan-4-yl-methylamine and pharmaceutically acceptable acid addition salts thereof.

(References on following page)

References Cited

FOREIGN PATENTS 253,256  11/1948  Switzerland _____ 260—340.9

OTHER REFERENCES

Blicke et al., "Journal American Chemical Society", vol. 74, 1952, pp. 2613-15.

Brown et al., "Chemical Abstracts", vol. 44 (1950), col. 1608c.

ALEX MAZEL, Primary Examiner

J. H. TURNIPSEED, Assistant Examiner

U.S. Cl. X.R.

424—278

UNITED STATES PATENT OFFICE
CERTIFICATE OF CORRECTION

Patent No. 3,629,287      Dated December 21, 1971

Inventor(s)  Waldo R. Hardie and Joseph E. Aaron

It is certified that error appears in the above-identified patent and that said Letters Patent are hereby corrected as shown below:

In the Specification:

In the table in Column 9 and 10, the formula under Step II should be:

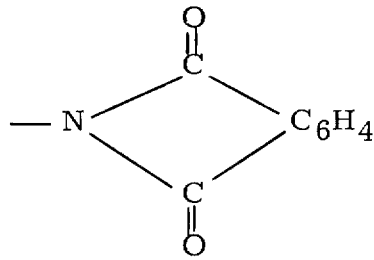

In the Claims:

Claim 1, in the formula, the "$R_1$" should be --- $R^1$ ---.

Signed and sealed this 13th day of June 1972.

(SEAL)
Attest:

EDWARD M. FLETCHER, JR.
Attesting Officer

ROBERT GOTTSCHALK
Commissioner of Patents